United States Patent
Suryavanshi et al.

(10) Patent No.: US 9,819,495 B2
(45) Date of Patent: Nov. 14, 2017

(54) SYSTEMS AND METHODS OF DYNAMICALLY ADAPTING SECURITY CERTIFICATE-KEY PAIR GENERATION

(71) Applicant: QUALCOMM Incorporated, San Diego, CA (US)

(72) Inventors: Vijay Anandrao Suryavanshi, San Diego, CA (US); Daniel Scott Abplanalp, Salem, OR (US); Zhidian Du, San Diego, CA (US); Vaibhav Sudhir Jain, San Diego, CA (US); Bryant Keith Forsgren, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 14/504,669

(22) Filed: Oct. 2, 2014

(65) Prior Publication Data

US 2016/0099813 A1   Apr. 7, 2016

(51) Int. Cl.
*H04L 29/06* (2006.01)
*H04L 9/32* (2006.01)
*H04L 9/14* (2006.01)
*H04L 9/08* (2006.01)

(52) U.S. Cl.
CPC ............ *H04L 9/3263* (2013.01); *H04L 9/088* (2013.01); *H04L 9/14* (2013.01); *H04L 2209/24* (2013.01); *H04L 2209/64* (2013.01)

(58) Field of Classification Search
CPC ... H04L 9/0825; H04L 9/0662; H04L 9/0822; H04L 9/0869; H04L 9/3231; H04L 9/302; H04L 63/061; H04L 63/0853

USPC ............................................. 713/175; 380/44
See application file for complete search history.

(56) References Cited

U.S. PATENT DOCUMENTS

| | | | |
|---|---|---|---|
| 7,209,563 B1 | 4/2007 | Calvez et al. | |
| 8,533,482 B2 | 9/2013 | Sun et al. | |
| 2003/0086570 A1* | 5/2003 | Riedel | G06F 21/6209 380/277 |
| 2005/0190912 A1* | 9/2005 | Hopkins | H04L 9/3033 380/44 |
| 2005/0213758 A1* | 9/2005 | Lenstra | H04L 9/3013 380/44 |

(Continued)

FOREIGN PATENT DOCUMENTS

| | | |
|---|---|---|
| JP | H10164656 A | 6/1998 |
| WO | 0197441 A2 | 12/2001 |

OTHER PUBLICATIONS

International Search Report and Written Opinion—PCT/US2015/046928—ISA/EPO—Nov. 30, 2015.

*Primary Examiner* — Izunna Okeke
*Assistant Examiner* — Hee Song
(74) *Attorney, Agent, or Firm* — The Marbury Law Group

(57) ABSTRACT

Embodiments include systems and methods of certificate-key pair generation. A processor of a network element may anticipate a demand for certificate-key pairs, and the processor may generate certificate-key pairs at a key length in accordance with the anticipated demand. The processor may monitor whether the generation of the certificate-key pairs at the key length meets an observed demand for the certificate-key pairs. The processor may adjust the key length when the generation of the certificate-key pairs at the key length does not satisfy the observed demand for the certificate-key pairs.

24 Claims, 12 Drawing Sheets

(56) References Cited

U.S. PATENT DOCUMENTS

| | | |
|---|---|---|
| 2005/0213785 A1 | 9/2005 | Koura et al. |
| 2006/0126842 A1* | 6/2006 | Campagna ............ H04L 9/0662 380/258 |
| 2008/0022121 A1* | 1/2008 | Fu ......................... H04L 63/061 713/185 |
| 2008/0022122 A1* | 1/2008 | Parkinson ............. H04L 63/061 713/185 |
| 2008/0170692 A1 | 7/2008 | Eastham et al. |
| 2008/0170693 A1* | 7/2008 | Spies .................. G06F 21/6209 380/277 |
| 2008/0298584 A1* | 12/2008 | Ahmed ................. H04L 9/0662 380/46 |
| 2009/0103726 A1 | 4/2009 | Ahmed |
| 2009/0192942 A1* | 7/2009 | Cottrille ................... H04L 9/30 705/59 |
| 2009/0316910 A1* | 12/2009 | Maeda ................. H04L 9/0855 380/279 |
| 2012/0183135 A1* | 7/2012 | Paral ........................ G09C 1/00 380/44 |
| 2013/0051557 A1 | 2/2013 | Shimamura |
| 2014/0205087 A1* | 7/2014 | Sakumoto ............ H04L 9/3271 380/30 |
| 2014/0215540 A1* | 7/2014 | Podolsky ............... H04N 21/61 725/98 |
| 2014/0244785 A1* | 8/2014 | Potlapally ............. H04L 67/10 709/217 |

\* cited by examiner

SYSTEMS AND METHODS OF DYNAMICALLY ADAPTING SECURITY CERTIFICATE-KEY PAIR GENERATION

BACKGROUND

Some applications that run on a computing device employ a cryptographic system to provide security for the application. One such cryptosystem involves a certificate-key pair. An application that requires a certificate-key pair may include a certificate-key pair in an application download package, or the device may be instructed to download the certificate-key pair from a server when the application is downloaded to the device (e.g., from a Device Management Server, or DMS). For example, for a newly-downloaded application, a device may download provisioning parameters from a DMS, and the provisioning parameters may include a certificate-key pair. When the DMS receives a request from a client device for a certificate-key pair as part of the provisioning request, the DMS is responsible for generating a certificate-key pair for the device. One example of a certificate-key pair is an RSA key-pair.

Certificate-key pair request traffic at the server may vary over time. Causes of traffic variability may include a public release of a new application package and certificate revocation, both of which may cause a spike in requests for new certificate-key pairs from the server. Also, demands for certificate-key pairs may also vary by time of day or day of week due to normal business cycles. Generating certificate-key pairs when they are requested is computationally intensive since it involves generating large k-bit prime numbers and testing them for primality. For example, generating RSA 2048 bit keys may take greater than one second. When requests for certificate-key pairs become sufficiently numerous, a server may be unable to generate sufficient certificate-key pairs to meet the demand within a required time period.

SUMMARY

The various embodiments include methods of certificate-key pair generation, which may be implemented in a server of a network element, and may include anticipating a demand for certificate-key pairs, generating certificate-key pairs at a key length in accordance with the period of time anticipated demand, monitoring whether a generation rate of certificate-key pairs at the key length meets an observed demand for the certificate-key pairs, and adjusting the key length when the generation rate of certificate-key pairs at the key length does not satisfy the observed demand for certificate-key pairs. In an embodiment, anticipating the demand for certificate-key pairs may include determining a number of certificate-key pairs to be requested. In an embodiment, anticipating the demand for certificate-key pairs may be based on at least one of historical requests for the certificate-key pairs, a historical pattern of certificate-key pair requests, a historical certificate-key pair request rate, an anticipated event, and a likelihood that a user or group of users will download an application that requires a certificate-key pair.

In an embodiment, the observed demand for certificate-key pairs may include a number of requests for certificate-key pairs received at a network element. In an embodiment, the observed demand for certificate-key pairs may include a plurality of requests for certificate-key pairs received during a period of time. In an embodiment, generating certificate-key pairs at a key length in accordance with the anticipated demand for certificate-key pairs may include determining a start time to begin generating certificate-key pairs. In an embodiment, generating certificate-key pairs at a key length in accordance with the anticipated demand for certificate-key pairs may include determining a start time to begin generating certificate-key pairs such that the anticipated demand for certificate-key pairs will be satisfied. In an embodiment, adjusting the key length when the generation rate of certificate-key pairs at the key length does not satisfy the observed demand for the certificate-key pairs may include generating at least one certificate-key pair at a second key length that is shorter than the key length. In an embodiment, adjusting the key length when the generation rate of certificate-key pairs at the key length does not satisfy the observed demand for the certificate-key pairs may include generating certificate-key pairs at a proportion of the key length and the second key length based on the observed demand.

Further embodiments include a computing device including a processor configured with processor-executable instructions to perform operations of the embodiment methods described above. Further embodiments include a non-transitory processor-readable storage medium having stored thereon processor-executable software instructions configured to cause a processor to perform operations of the embodiment methods described above. Further embodiments include a computing device that includes means for performing functions of the operations of the embodiment methods described above.

BRIEF DESCRIPTION OF THE DRAWINGS

The accompanying drawings, which are incorporated herein and constitute part of this specification, illustrate exemplary embodiments of the invention. Together with the general description given above and the detailed description given below, the drawings serve to explain features of the invention, and not to limit the disclosed embodiments.

DETAILED DESCRIPTION

Figure 1:
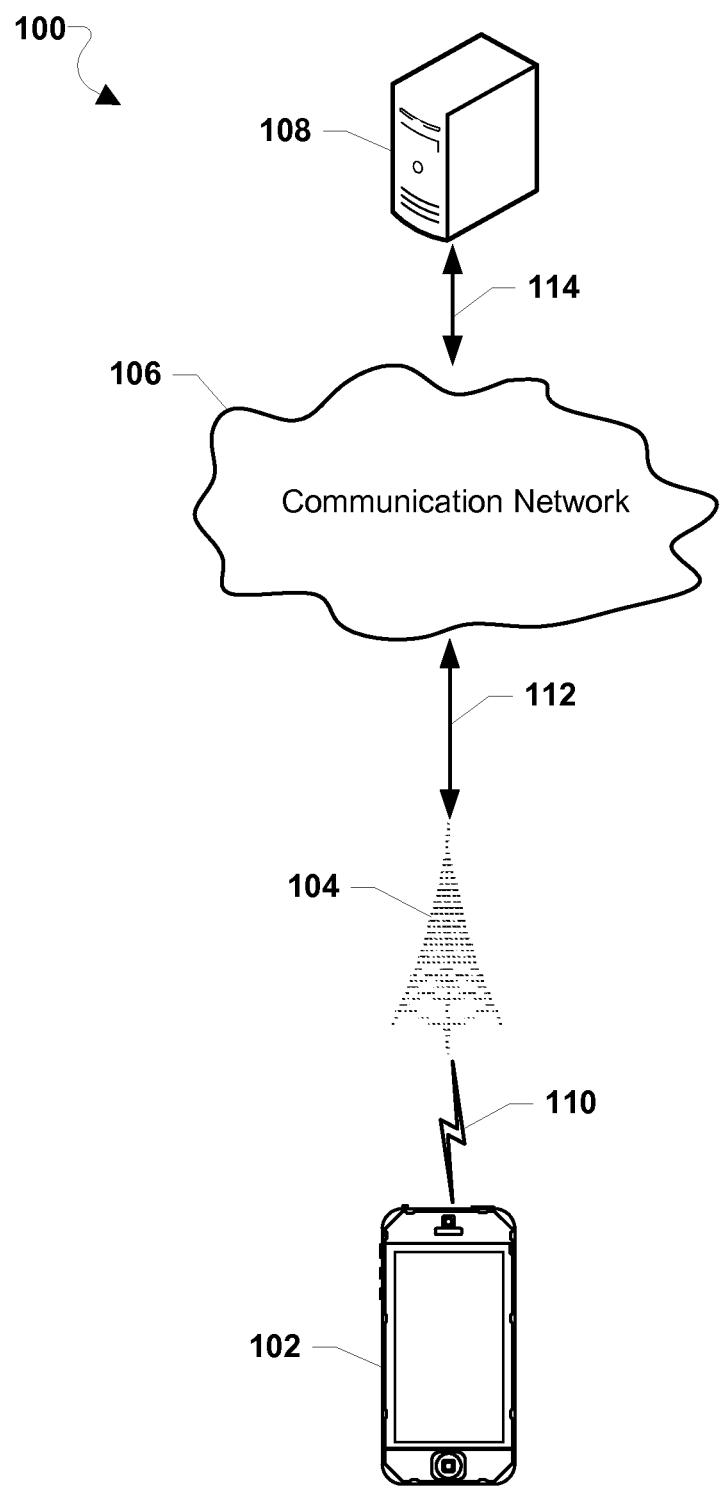
FIG. 1 is a communication system block diagram of communication networks suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

In overview, the various embodiments provide methods implemented by a processor executing on a network element, such as a server, to control the generation of CK pairs in order to better meet demands for keys, particularly during times when large demands for keys are experienced or anticipated.

The terms "communication device", "mobile device," and "mobile communication device" are used interchangeably herein to refer to any one or all of cellular telephones, smartphones, personal or mobile multi-media players, personal data assistants (PDAs), laptop computers, tablet computers, smartbooks, palmtop computers, wireless electronic mail receivers, multimedia Internet enabled cellular telephones, wireless gaming controllers, and similar electronic devices which include a programmable processor and a memory. Various embodiments may be useful in mobile communication devices, such as smart phones, cellular telephones and other portable computing platforms. Various embodiments may be particularly useful in any devices that use radio protocol stacks to communicate with a communication network under a subscription.

The term "certificates", "keys", "certificate-key pairs", and the like as used herein are intended to include cryptographic keys that may be used to provide a security function, such as, but not limited to, data elements generated by cryptographic algorithms, including asymmetric cryptographic algorithms. In a certificate-key (CK) pair, one element may include a public key, which may be available to any requesting device, and another element may include a private key, which may be unique to a specified device and/or user. A CK pair may thus be unique, and may be associated with a specified device and/or user.

Traditionally, a server generates a CK pair in response to a request for a CK pair received from a client (e.g., a communication device, or an application running on a communication device), and then sends the CK pair to the client. Generating CK pairs takes a finite amount of time. When the rate at which requests are received is low, a server can easily satisfy CK pair request by generating the pairs on demand. However, the number of requests for CK pairs received by a server may vary over time. For example, when a new application, or a new version of an application, is released or made available, a large number of downloads in a relatively short period of time may result in a surge in requests for CK pairs from devices that download the application. As another example, an event that invalidates extant certificates, such as an operations failure in a service provider network, or a response to a security breach in which a provider proactively invalidates extant certificates, may cause a spike in requests for certificates from the affected application. When the rate at which CK pairs are requested exceeds the rate at which such pair can be generated, the server may fall behind and some clients may have to wait an unacceptable amount of time before their requests are satisfied. A relatively large number of requests for CK pairs received within a short time may overwhelm the ability of a server to provide keys to meet the demand, which may result in failures to deliver keys to requesting clients, delay in authenticating or launching an application, and degradation in a user's experience.

The generation of a new CK pair is computationally intensive, and the computational intensity, and thus generation time, increases as the length of the key increases. On the other hand, as the length of a key increases, the security of the key increases, so many clients are likely to request long keys. An additional factor in key generation may include an amount of available entropy, which may be used to generate a truly random (and therefore secure) key. When available entropy is limited, key generation may be delayed until sufficient entropy can be obtained to generate a secure key.

A key length is typically measured in bits. For example, the AES protocol may use 256 bit keys, and the RSA protocol may use 2048-bit and 4096-bit keys. Each additional bit of a key increases the difficulty of a brute-force attack exponentially. However, each additional bit also slows down both the generation of a key, as well as the speed of the cryptosystem overall. Thus, key length may include, among other things, a tradeoff between the speed of key generation and the security of the generated key.

The various embodiments include server-implemented methods to better manage the generation of CK pairs in order to balance demand, particularly anticipated demands, against generation time and security. In some embodiments, the methods may include adapting the quantity and/or the timing of certificate-key pair generation based on environmental constraints and other factors so that certificate-key pairs are generated in advance but just prior to when they are required, rather only than in response to received requests for certificates. The environmental constraints and other factors that a server may use to anticipate CK pair demand may include several factors. For example, the server may predict future certificate-key demand based on past demand cycles or patterns for certificate-key pairs at particular times of day, days of week, days of months, calendar dates, and other times and time periods. The server may also predict future certificate-key demand in response to particular events or occurrences or anticipated events. The server may determine how many CK pairs to generate in advance and when to start such advance generates based upon the anticipated demand and the rate at which CK pairs can be generated, which depends on key length.

The server may determine a timing and/or quantity of keys to be generated based on an anticipated future event, such as the likelihood that an application will be downloaded (and the anticipated demand for the application), or the likelihood that a particular user will download an application. For example, software vendors may notify the server of an impending update of software requiring a certificate-key pair for operation that is likely to create an increased demand for certificate-key pairs. As another example, based on particular users' past download history and/or application usage history, the server may determine a probability that a group of users may download an application requiring CK pairs.

The server may also determine a key length of CK pairs to generate based on a current number of requests for certificate-key pairs, a trend of received requests for certificate-key pairs over time, and/or available processor resources at the server. For example, when the server cannot keep up with the demand for certificate-key pairs that are generated at a first key length, the server may adjust the length of at least some of the keys such that some keys are generated more quickly using a second, shorter length. For example, when the server cannot keep up with the demand for certificate-key pairs with a 4096 bit length, the server may adjust the length of at least some of the keys to a 2048 bit length that can be generated much faster. As another example, the server may change the proportion of 2048-bit keys and 4096-bit keys generated when all requests cannot be met with 4096-bit keys.

The server may also adjust generated key length based on an amount of available entropy at the server for use in generating such keys. For example, if the server determines that a certain number of keys of a first length (e.g., 4096-bit keys) are required within a certain time period, and that the available entropy at the server is insufficient to generate that number of keys at the first length, the server may adjust the length of at least some of the keys such that some keys are generated more quickly using a second, shorter length (e.g., 2048-bit keys) which require less entropy to generate. Additionally, the server may request entropy from other servers to meet the demand. The proportion of first length keys and second length keys may thus also be determined according to the amount of entropy available from other servers.

Various embodiments may be implemented within a variety of communication systems 100, an example of which is illustrated in FIG. 1, comprising a communication device 102, a base station 104, a communication network 106, and a server 108. The communication device 102, which may include a mobile communication, may be in communication with the communication network 106 through a communication link 110 to the base station 104. The base station 104 may be in communication with the communication network 106 over a wired or wireless communication link 112, which may include fiber optic backhaul links, microwave backhaul links, and other similar communication links. In some embodiments, the communication network may include a mobile telephony communication network. In some embodiments, the communication link 110 may include a cellular connections that may be made through two-way wireless communication links using a wireless communication protocol such as 3GPP Long Term Evolution (LTE), Worldwide Interoperability for Microwave Access (WiMAX), Code Division Multiple Access (CDMA), Time Division Multiple Access (TDMA), Wideband CDMA (WCDMA), Global System for Mobility (GSM), and other mobile telephony communication technologies or radio access technology (RAT). While the communication link 110 is illustrated as a single link, in some embodiments, the communication device communicates with the base station using more than one RAT.

The server 108 may be in communication with the communication network 106 through a communication link 114. The server may include a storage device, such as a disk drive, flash drive, data storage circuitry, or other memory device, which may store one or more instructions or code on a non-transitory computer-readable storage medium or non-transitory processor-readable storage medium, and may be configured to generate CK pairs. While the server 108 is illustrated as a single network element, in some embodiments the server 108 may include two or more servers or other similar network elements.

Figure 2:
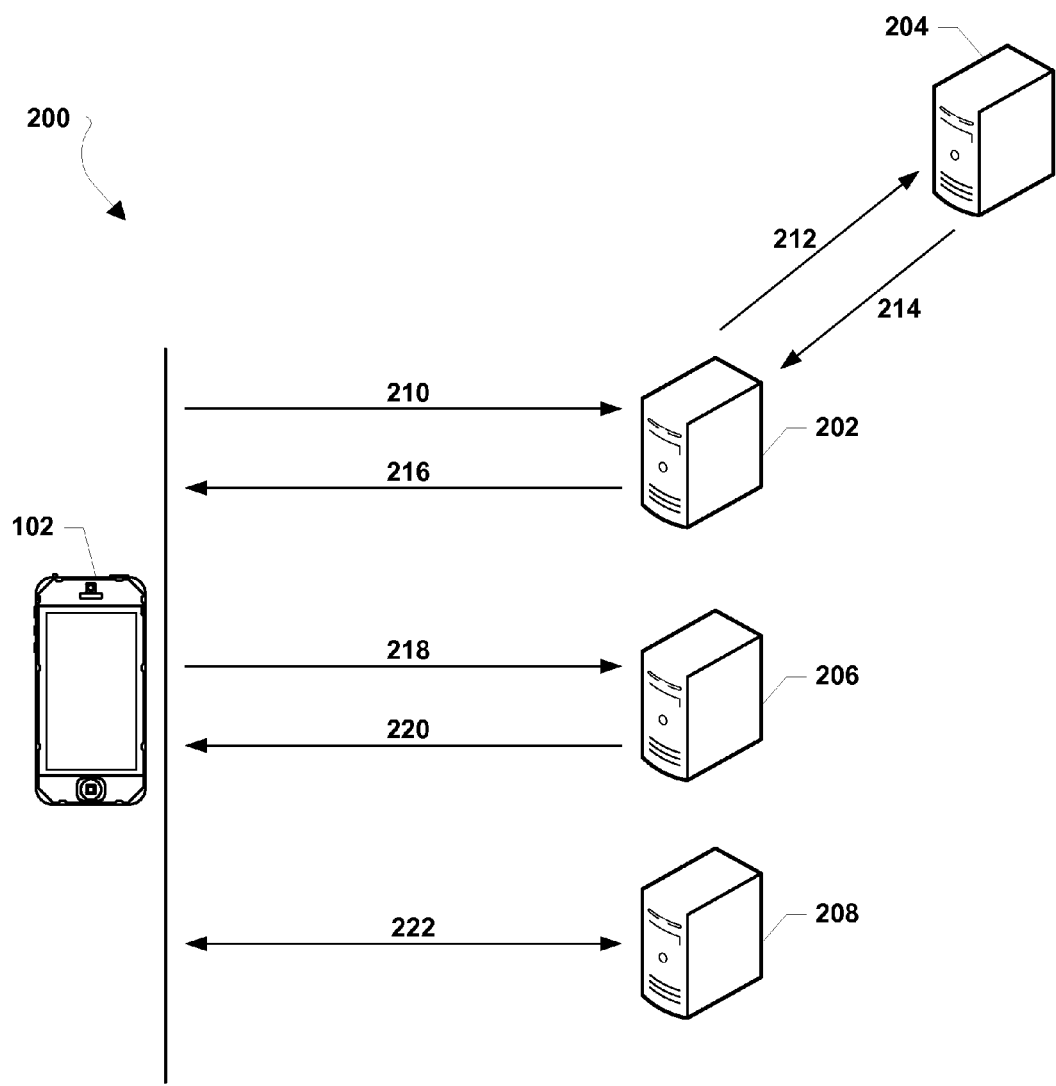
FIG. 2 is a flow diagram of client certificate distribution, according to various embodiments.

FIG. 2 illustrates a method 200 for client certificate distribution according to some embodiments. Mobile communication device 102 may send a request 210 for a certificate to a server 202. The server 202 may include, for example, a front-end server configured to receive a certificate request. For example, the mobile communication device may download an application requiring a CK pair for operation, and upon launch of the application the application may send (or may instruct the sending of) the request for a certificate. As another example, the mobile communication device may receive a message that a certificate for an application has been may send the request for the certificate.

In response to receiving the request for the certificate, the server 202 may send a request 212 for a client certificate to a server 204. The server 204 may include a certificate authority, such as a root certificate authority server, which may be configured to generate a unique certificate for the mobile communication device and/or application on the mobile device in response to the request 212. The server 204 may generate a CK pair and may send 214 the generated CK pair to the server 202. The server 220 may then send 216 the generated CK pair to the mobile device 102, which may store the CK pair in a memory.

In an embodiment, the mobile device may send a request 218 to a server 206 to register for or to request access to a service provided by the server. For example, the server 206 may be an application server configured to provide a service. The request 218 may include at least a portion of the CK pair. In response to the request 218, the server 20 may register the mobile device, or may determine that the mobile device is authorized to access the requested service, and further may send response 220 which may include a notification that the mobile device is authorized to use or access the service. Authentication between the mobile device and the server 206 may use the CK pair and may utilize Transport Layer Security (TLS), Secure Socket Layer (SSL), or another cryptographic protocol. In an embodiment, the server 206 can include a proxy server or other similar network element that may be configured to receive service access requests and to handle authentication processes. In such case, a server 208 may provide services 222 to mobile device 102 after successful authentication is completed. However, in the absence of a valid CK pair, authentication and access to the service would be denied to the mobile device.

In an embodiment, the server 208 can include an application layer gateway, an application server, or another similar network element configured to provide services to the mobile device. For example, in an embodiment, the server 206 may include a SIP proxy and the server 208 may include a gateway for a communication service, such as Q-Chat®. The request 218 from the mobile device may include a registration request for the communication service (which may utilize a cryptographic protocol), and the response 220 from the server 206 may include a notification of registration for the communication service. The server 208 may include an application layer gateway configured to provide the communication service (222) to the mobile device upon successful registration through the server 206. In some embodiments, the server 208 may include an application server, or may be in communication with an application server (not illustrated) that may be configured to provide a service, such as a Q-Chat application server or a similar service.

While FIG. 2 illustrates one request from the mobile device for a CK pair, in operation a server may receive numerous requests from different devices for certificates. An amount of requests for CK pairs from the server may vary over time. For example, when a new application, or a new version of an application, is released or made available, a large number of downloads in a relatively short period of time may result in a surge in requests for CK pairs from devices that download the application. As another example, an event that invalidates extant certificates, such as an operations failure in a service provider network, or a response to a security breach that proactively invalidates extant certificates, may cause a spike in requests for certificates from the affected application.

Figure 3:
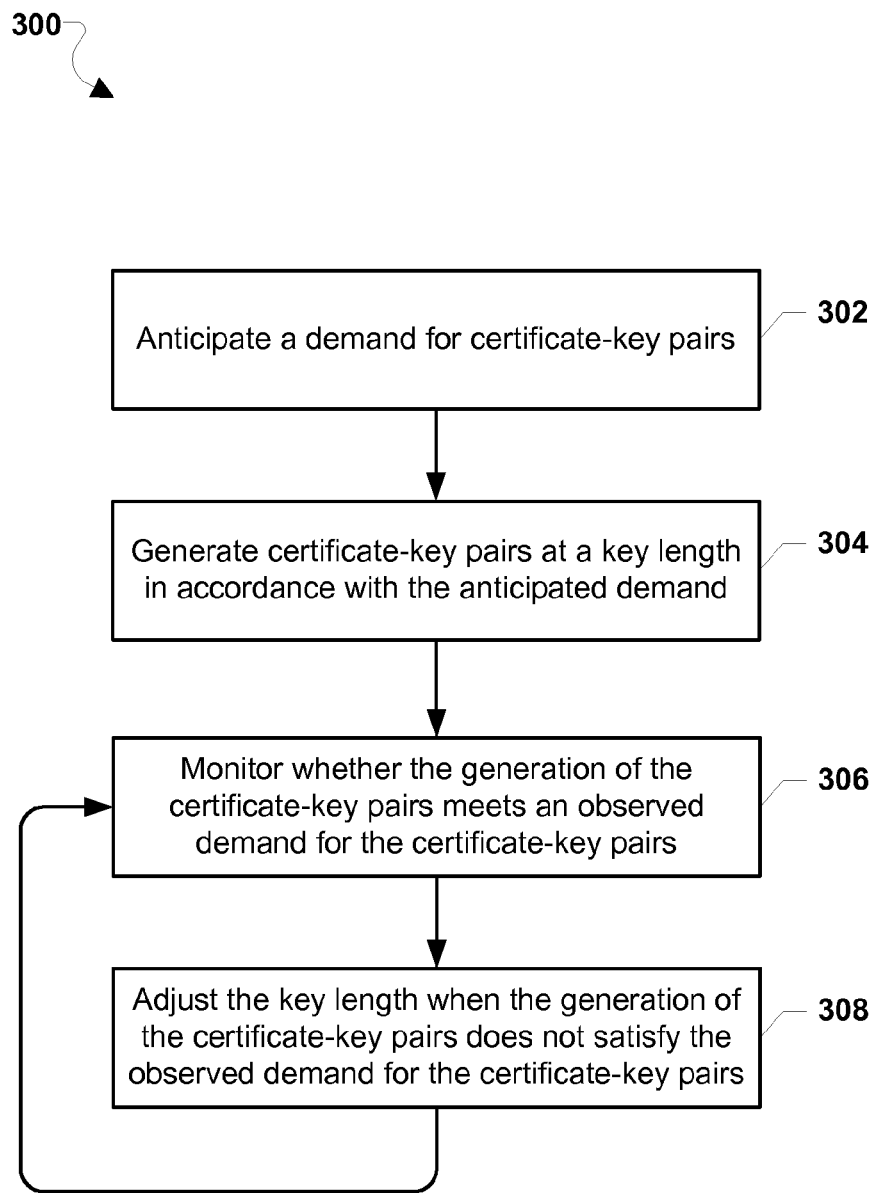
FIG. 3 is a process flow diagram illustrating a method of certificate-key pair generation, according to various embodiments.

FIG. 3 illustrates a method 300 for certificate-key pair generation according to various embodiments. The method 300 may be implemented by a processor of a network element, such as a processor of the server 108 of FIG. 1 or any another similar processor. In block 302, the server may determine an anticipated number of certificate-key pairs to be requested for an application. For example, the server may predict future CK pair demand based on past or historical requests for certificate-key pairs at a particular time of day, day of the week, or another time or time period. The prediction may also be based on a historical pattern of requests for CK pairs at the server based on a certificate-key pair generation history, which may be determined based on historical requests at a particular time(s) and/or time period (s). The prediction may also be based on a historical rate of requests for CK pairs over a time period or periods. As one example, predetermined time windows may be determined (e.g., three time windows—9 am-5 pm, 5 pm-1 am, and 1 am-9 am), and the server may determine patterns of CK pair requests during the time windows. Patterns of CK pair demand may also be determined for known holidays and events. The patterns of CK pair demand may also be determined for specific applications, or for specific application types. The server may also correlate CK pair demand for a specified application (or application type) among time(s), day(s), holiday(s), event(s), and other similar criteria.

The server may also predict future CK pair demand based on particular events or occurrences, including an anticipated event or occurrence. For example, in response to a notification that a new version of an application is scheduled for release at a predetermined date and time, a future CK pair demand may be determined for the application. As another example, in response to a notification that an extant certificate for an application has been invalidated—for example, to trigger an update in application security credentials—a future CK pair demand may be determined for the application. The notification may be provided to the server, for example, by a network operator or service provider, or by a provider of the relevant application.

The server may further predict CK pair demand based on the likelihood of a particular user or group of users to download a particular application that requires a CK pair, and thus that the application or device of the user or group will request a certificate. For example, a user or group of users that have previously downloaded a type of application may be considered more likely to download a new application of the same type. For example, a user or group that has downloaded an application (or applications) to play video content may be determined to more likely to download a new video content player application. A download pattern of the user or group may be used to determine the likelihood of the user or group downloading a particular application. For example, the likelihood of a user or group to download a particular application may be based on the number of times an application type has been downloaded by the user/group in the past, a number of members in the group, and/or a number of applications of the same or similar type downloaded by the user/group. Based on the likelihood of a particular user or group of users to download a particular application that requires a CK pair, the server may predict CK pair demand.

In block 304, the server may generate certificate-key pairs at a key length in accordance with the anticipated demand. The server may determine a time to begin the generation of CK pairs that is close to a predicted time at which the CK pairs will be requested and yet provides sufficient time to generate sufficient CK pairs to satisfy the anticipated demand. The server may therefore determine the start time of CK pair generation based on the anticipated or predicted demand for the CK pairs.

In block 306, the server may monitor whether the generation of the certificate-key pairs at the key length meets an observed demand for the certificate-key pairs. When the server actually receives requests for CK pairs, the server may monitor the number of requests received, as well as the number of CK pairs that have been generated. The server may also monitor a rate at which additional CK pairs are generated. The observed demand for CK pairs may comprise a number of requests received during a window of time (e.g., five minutes), a number of requests for CK pairs received during a time period (e.g., since the start time of CK pair generation, or during a predetermined time period such as 9 am-5 pm, or another time period), a rate of observed requests, a rate of increase or decrease in the number of observed requests, or another observer demand for CK pairs.

In block 308, the server may adjust the key length when the generation of the certificate-key pairs at the key length does not satisfy the observed demand for the certificate-key pairs. For example, the server may determine that the observed demand for CK pairs is greater than the number of generated CK pairs. Additionally, or alternatively, the server may determine that the observed demand for CK pairs will exceed a rate at which CK pairs are being generated. The server may tune the rate of CK pair generation by adjusting the length of keys being generated by the server. The adjustment may include generating one or more CK pairs at a shorter length, which may be generated more quickly than keys of a longer length. Adjustment of the length of generated keys may also include determining a proportion of keys having a first length and keys having a second length to generate to satisfy the demand. In an embodiment, when the observed demand meets a threshold, the server may adjust the length of one or more keys to be generated to satisfy the observed demand. In an embodiment, when the number of generated CK pairs in a buffer decreases and meets a threshold, the server may adjust the length of one or more keys to be generated to satisfy the observed demand. In some embodiments, the server may continue to monitor whether the generation of CK pairs meets the observed demand, and may further adjust the key length to satisfy the observed demand.

Figure 4:
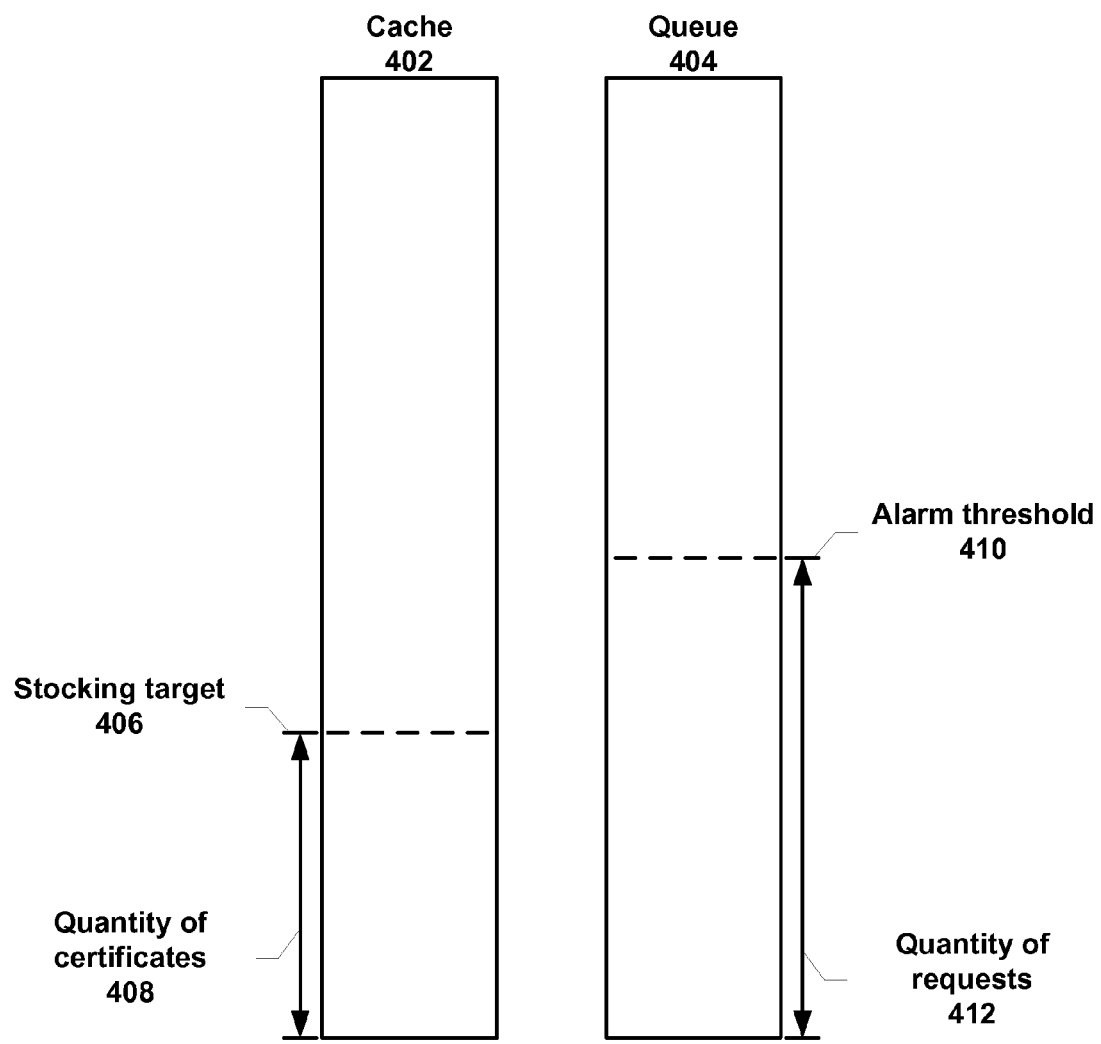
FIG. 4 is a diagram illustrating a cache of certificate-key pairs and a queue of requests for certificate-key pairs, according to various embodiments.

FIG. 4 is a diagram illustrating a cache 402 of certificate-key pairs and a queue of requests 404 for certificate-key pairs, according to various embodiments. In some embodiments, a server, such as server 108 of FIG. 1, may store generated CK pairs in the cache. The server may send a stored CK pair to a requesting device (e.g., mobile device 102 of FIG. 1) when the server receives a request for a CK pair from the requesting device. The server may also monitor a number or quantity of stored CK pairs 408 relative to a stocking target 406 of CK certificates stored in the cache. The stocking target may include a target quantity of CK pairs stored in the cache to satisfy an anticipated demand for certificates. The server may monitor the quantity of certificates, and may generate CK pairs and/or adjust the length of keys based on the quantity of certificates in the cache. In some embodiments, when the quantity of certificates drops below the stocking target, the server may generate additional CK pairs. In some embodiments, when the quantity of certificates drops below the stocking target, the server may also adjust the key length of generated CK pairs. For example, when the quantity of certificates remains below the stocking target, e.g., for a predetermined period of time, the server may adjust the length of at least one key to increase the rate of CK pair generation. In some embodiments, as the duration of time in which the quantity of certificates remains below the stocking target increases, the server may further adjust the length of generated keys, e.g., by generating an increasing proportion of shorter length keys.

The server may also place received requests for CK pairs into a queue 404. The server may also place received requests for CK pairs into the queue and may monitor a quantity of received requests 412 stored in the queue. The server may generate CK pairs and/or adjust the length of keys based on the quantity of received requests in the queue. The queue may also include an alarm threshold of requests 410. In some embodiments, when the quantity of requests exceeds the alarm threshold, the server may generate additional CK pairs. In some embodiments, when the quantity of requests exceeds the alarm threshold, the server may also adjust the key length of generated CK pairs. When the quantity of requests remains above the alarm threshold, e.g., for a predetermined period of time, the server may adjust the length of at least one key to increase the rate of CK pair generation to satisfy the quantity of requests. In some embodiments, as the duration of time in which the quantity of requests remains above the alarm threshold increases, the server may further adjust the length of generated keys, e.g., by generating an increasing proportion of shorter length keys.

In some embodiments, the server may monitor the stocking target 406, which may include a minimum number of keys to be maintained, to be provided in response to CK pairs. The stocking target may also include a target key length, e.g., a first, longer key length, which is both more secure and requires more time to generate than a second, shorter key length. In some embodiments, when the quantity of certificates is reduced to a threshold number of certificates (e.g., the stocking target 406 in FIG. 4), the server may adjust the length of at least one generated key to increase the rate of CK pair generation to satisfy the quantity of requests. Further, when the quantity of certificates then rises above the threshold (i.e., the generated quantity of certificates exceeds the demand for CK pairs), the server may discard keys of the second, shorter key length, and replace them with keys generated at the first, longer key length.

Figure 5:
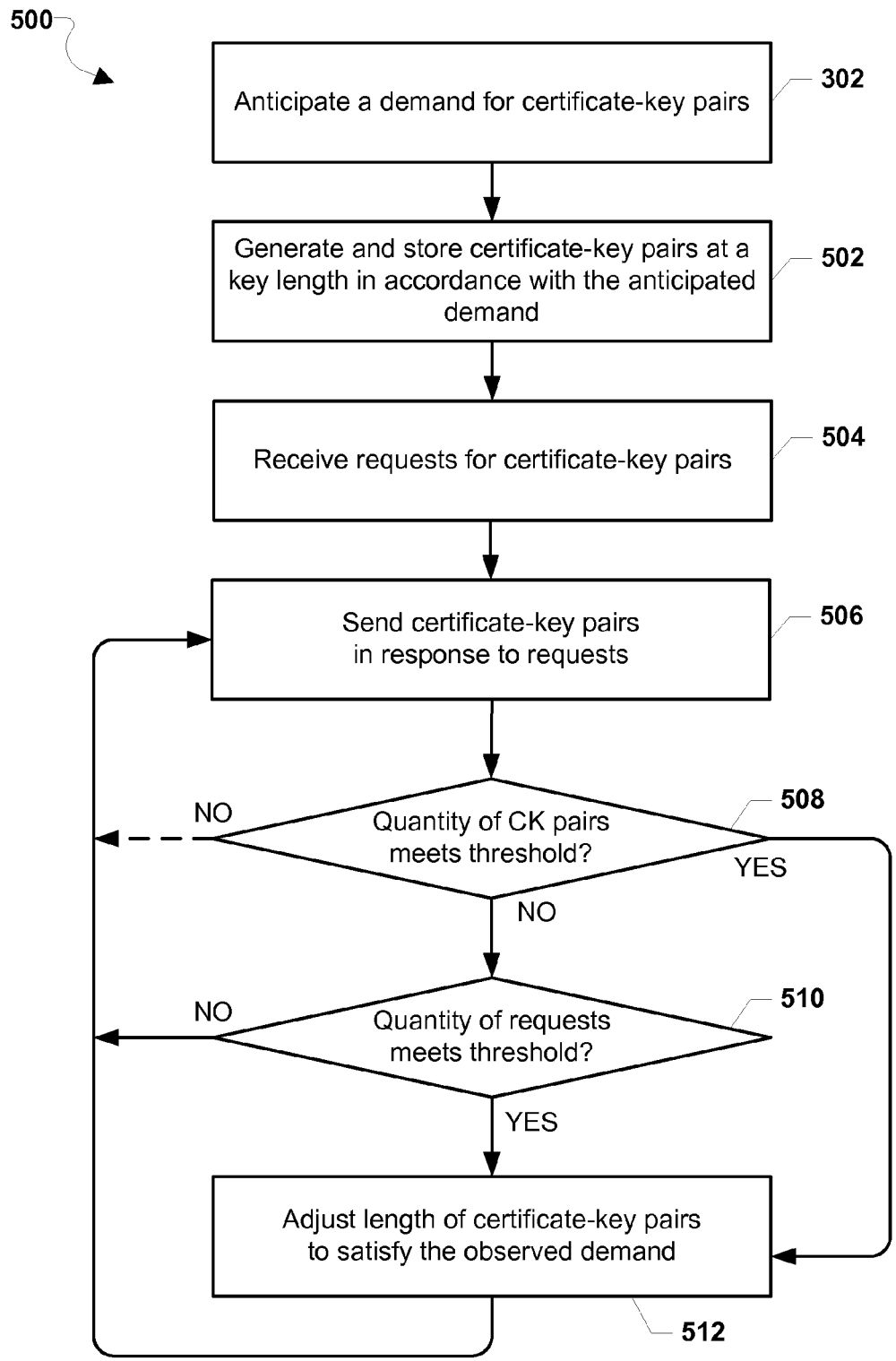
FIG. 5 is a process flow diagram illustrating another method of certificate-key pair generation, according to various embodiments.

FIG. 5 illustrates a method 500 for certificate-key pair generation according to various embodiments. The method 500 may be implemented by a processor of a network element (e.g., a processor of the server 108 of FIG. 1) or any another similar processor. In block 302, the server may determine an anticipated number of certificate-key pairs to be requested for an application. In block 502, the server may generate certificate-key pairs at a key length in accordance with the anticipated demand, and the server may store the generated CK pairs in a cache, such as the cache 402 in FIG. 4. In block 504, the server may receive requests for certificates from devices, such as the mobile device 102 of FIG. 1, and in block 506, the server may send CK pairs to the requesting devices.

The server may also monitor the number of stored CK pairs and the number of request for CK pair received by the server. In some embodiments, the server may only monitor the quantity of stored CK pairs, and when the quantity of CK pairs does not meet a threshold of certificates stored in the cache (e.g., stocking target 406 of FIG. 4) the server continues to send CK pairs in response to requests (illustrated as an optional path from determination block 508—"NO"). In determination block 508—"YES", when the quantity of CK pairs meets the threshold, the server may adjust the length of one or more CK pairs to be generated to satisfy the observed demand (in block 512). In some embodiments, in determination block 508—"NO", when the quantity of CK pairs does not meet a threshold of certificates stored in the cache, the server may determine whether the quantity of requests for certificates meets a request threshold, such as the alarm threshold 410 in FIG. 4. In determination block 510—"NO", When the quantity of requests for certificates does not meet the threshold, the server may continue to send CK pairs in response to requests (in block 506). In determination block 510—"YES", when the quantity of requests for certificates meets the request threshold, the server may adjust the length of one or more CK pairs to be generated to satisfy the observed demand (in block 512).

Figure 6:
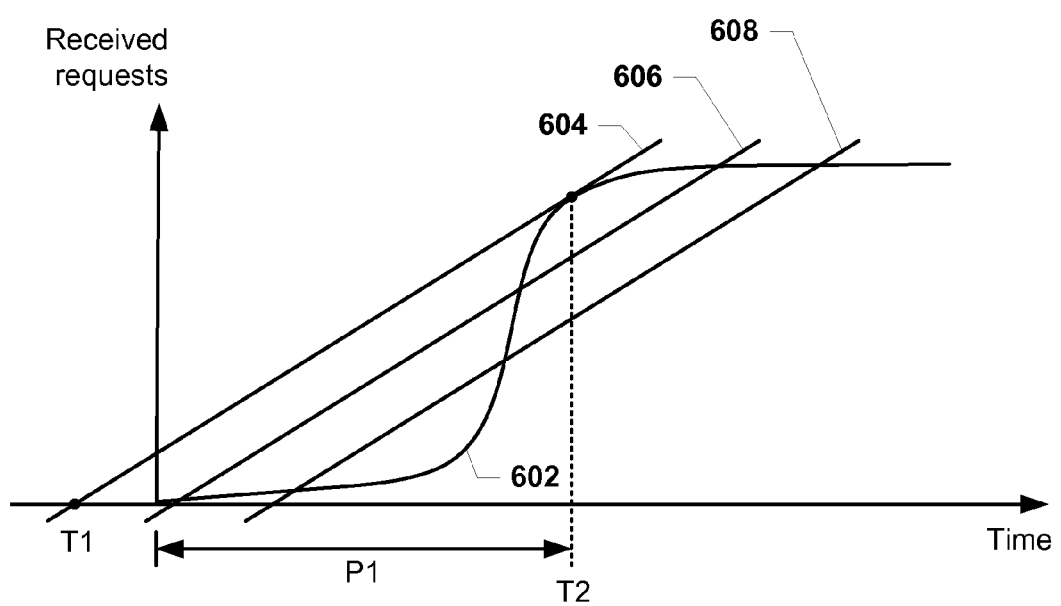
FIG. 6 is a diagram illustrating certificate-key pair generation and received requests, according to various embodiments.

FIG. 6 illustrates certificate-key pair generation and received requests over time, according to various embodiments. In some embodiments, a server may determine an anticipated number of certificate-key pairs 602 to be requested for an application (i.e., an anticipated demand). The server may receive the requests over time, and a rate of receipt may be non-linear. In some embodiments, during a time period P1, the rate of requests may surge or spike for various reasons. For example, the launch or update of an application that requires a CK pair may cause the number of requests for a certificate for the application to increase. The rate of the anticipated demand may also decrease, for example, at a time T2. In some embodiments, the predicted rate of receipt of requests for CK pairs may be considered to "peak" when the predicted receipt rate drops below a threshold rate.

Based on the anticipated number of certificate-key pairs 602, the server may determine a time to begin the generation of CK pairs that is close to a predicted time at which the CK pairs will be requested and yet provides sufficient time to generate sufficient CK pairs to satisfy the anticipated demand. In some embodiments, the time to begin the generation of CK pairs may be based on the predicted peak receipt rate of requests for certificates. For example, the server may consider various start times based on the anticipated number of certificate-key pairs 602 that may result in the server generating sufficient CK pairs to satisfy the anticipated demand. For example, CK pair production represented by lines 604, 606, and 608 each start at different times, and reflect a substantially linear rate of CK pair production at a given key length. In some embodiments, a slope of a tangent to the anticipated number of certificate-key pairs 602 may be determined at time T2 (the predicted peak receipt rate of requests for certificates). Based on the slope of the tangent, a start time T1 may be determined. Producing CK pairs at the server earlier than time T1 would result in an inefficient utilization of processor, memory, and other resources (e.g., entropy), and producing CK pairs at a time later than time T1 would not meet the anticipated demand. Thus, the server may determine a time to begin the generation of CK pairs that is close to a predicted time at which the CK pairs will be requested and yet provides sufficient time to generate sufficient CK pairs to satisfy the anticipated demand.

Figure 7A:
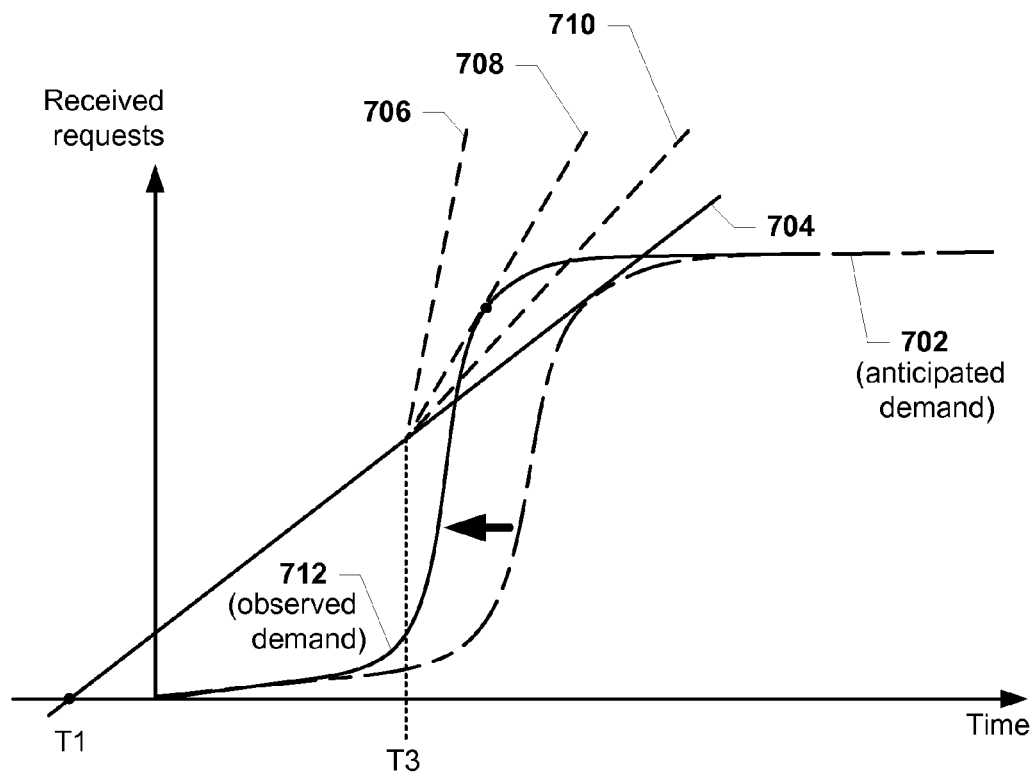
FIGS. 7A, 7B, and 7C are numbers-versus-time graphs illustrating certificate-key pair generation rates and received requests illustrating operations according to various embodiments.

FIG. 7A illustrates certificate-key pair generation and received requests over time, according to various embodiments. In some embodiments, a server may determine an anticipated number of certificate-key pairs 702 to be requested for an application (i.e., an anticipated demand), and the server may determine a start time T1 to begin generating CK pairs to meet the anticipated demand. However, an observed demand for certificates (based on, e.g., actual requests for certificates received at the served) may not conform to the predicted or anticipated demand. In some embodiments, actual or observed demand 712 may begin to increase sooner than anticipated. The server may determine based on the observed demand that generation of CK pairs at the initial key length 704 may not satisfy the observed demand for certificates. For example, a number of received requests in the observed demand may meet a threshold level of received requests at a time earlier than anticipated, for example, at time T3. In some embodiments, the threshold level may include a total number of received requests at time T3. In some embodiments, the threshold level may include a rate at which requests are received by the server.

When the server determines that the generation of CK pairs at the initial key link may not satisfy the observed demand, the server may adjust the key length to increase the rate of CK pair production to satisfy the observed demand. In some embodiments, the server may generate at least one CK pair at a shorter key length than the initial key length. The server may determine a quantity of CK pairs to generate using the shorter key length based on the observed demand. For example, lines 706, 708, and 710 each indicate adjusted CK pair generation that includes different numbers, or a different proportion, of CK pairs generated using the initial key length and the adjusted key length. Line 708 represents CK pair generation including a greater number of CK pairs generated using the shorter key length than line 710, and line 706 represents CK pair generation including a greater number of CK pairs generated using the shorter key length than line 708. The server may then generate CK pairs using the determined number (or determined proportion) of key lengths. In some embodiments, a slope of a tangent to the observed demand of certificate-key pairs may be determined at time T3, which may include the peak observed requests for certificates. In some embodiments, the peak for observed requests may be predicted based on the anticipated demand for certificates, which may be based on some or all of the information used to determine the anticipated demand. For example, the server may determine that the number (or proportion) of keys generated using the initial and adjusted key lengths that is represented by line 708 satisfies the observed demand, and the server may generate CK pairs accordingly.

Figure 7B:
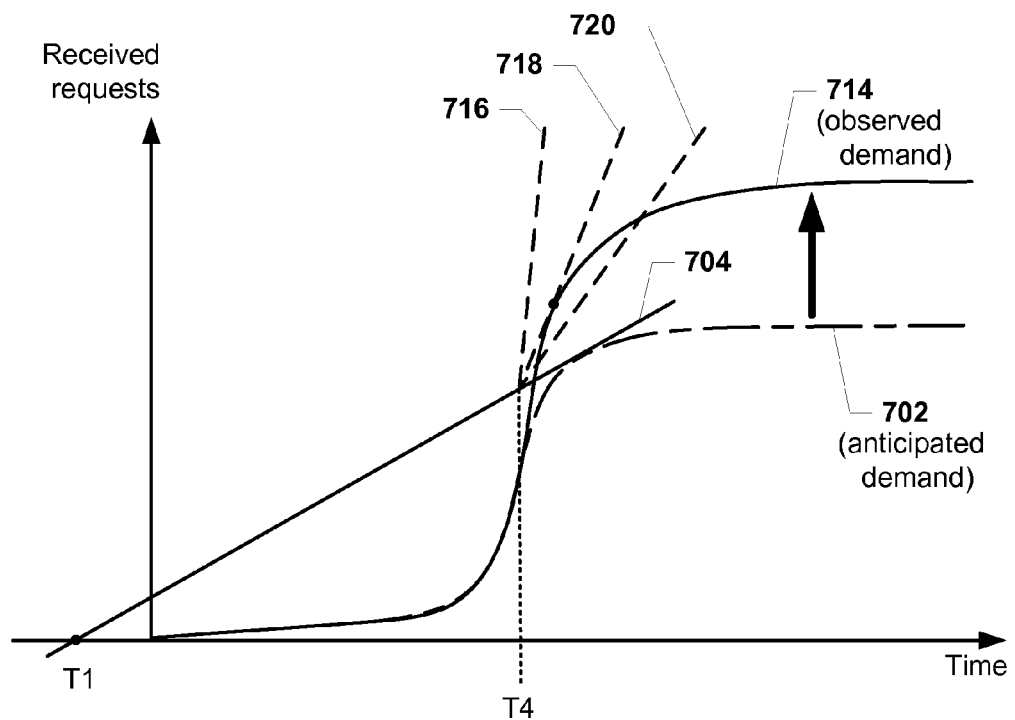

FIG. 7B illustrates certificate-key pair generation and received requests over time, according to various embodiments. In some embodiments, a server may determine an anticipated number of certificate-key pairs 702 to be requested for an application (i.e., an anticipated demand), and the server may determine a start time T1 to begin generating CK pairs to meet the anticipated demand. However, in some embodiments, actual or observed demand 714 may start at the anticipated time, but may be larger than anticipated. The server may determine based on the observed demand that generation of CK pairs at the initial key length 704 may not satisfy the observed demand for certificates. For example, a number of received requests in the observed demand may meet a threshold level of received requests at a time earlier than anticipated, for example, at time T4. As another example, a rate of receiving requests at the server may meet a threshold level of received requests at a time earlier than anticipated (e.g., at time T4). As another example, a rate of receiving requests at the server may not decrease at an anticipated rate (e.g., at time T4). In some embodiments, the threshold level may include a total number of received requests at time T4. In some embodiments, the threshold level may include a rate at which requests are received by the server.

When the server determines that the generation of CK pairs at the initial key link may not satisfy the observed demand, the server may adjust the key length to increase the rate of CK pair production to satisfy the observed demand. In some embodiments, the server may generate at least one CK pair at a shorter key length than the initial key length. The server may determine a quantity of CK pairs to generate using the shorter key length based on the observed demand. For example, lines 716, 718, and 720 each indicate adjusted CK pair generation that includes different numbers, or a different proportion, of CK pairs generated using the initial key length and the adjusted key length. Line 718 represents CK pair generation including a greater number of CK pairs generated using the shorter key length than line 720, and line 716 represents CK pair generation including a greater number of CK pairs generated using the shorter key length than line 718. The server may then generate CK pairs using the determined number (or determined proportion) of key lengths. In some embodiments, a slope of a tangent to the observed demand of certificate-key pairs may be determined at a time which may include the peak observed requests for certificates. In some embodiments, the peak for observed requests may be predicted based on the anticipated demand for certificates, which may be based on some or all of the information used to determine the anticipated demand. For example, the server may determine that the number (or proportion) of keys generated using the initial and adjusted key lengths that is represented by line 718 satisfies the observed demand, and the server may generate CK pairs accordingly.

Figure 7C:
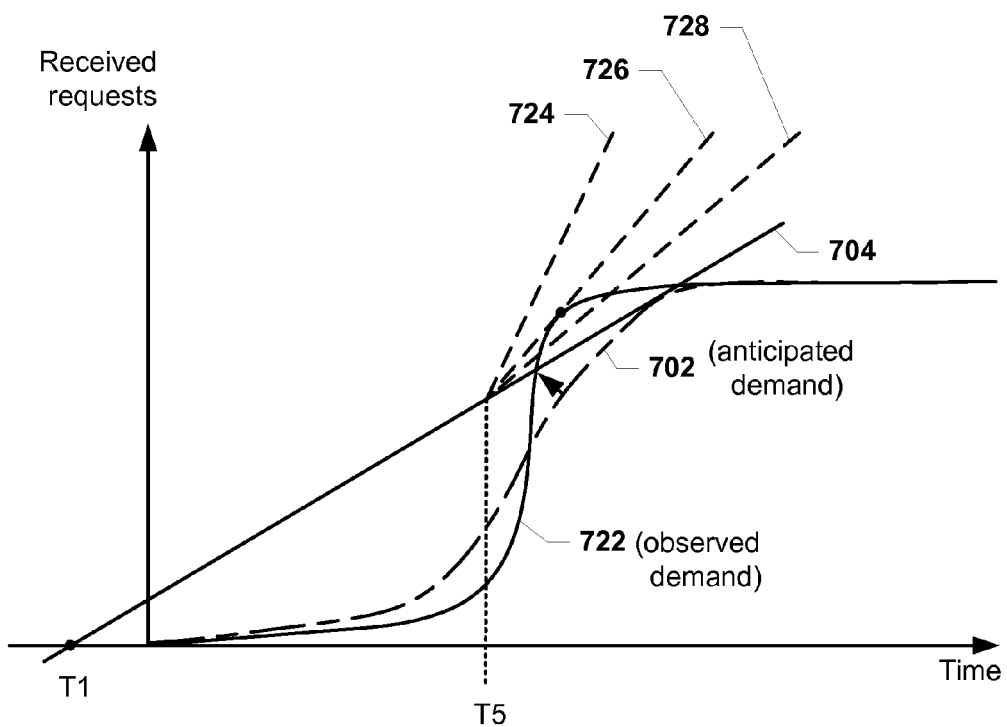

FIG. 7C illustrates certificate-key pair generation and received requests over time, according to various embodiments. In some embodiments, a server may determine an anticipated number of certificate-key pairs 702 to be requested for an application (i.e., an anticipated demand), and the server may determine a start time T1 to begin generating CK pairs to meet the anticipated demand. However, in some embodiments, actual or observed demand 722 may start at the anticipated time, but may have a greater rate of increase than anticipated. The server may determine based on the observed demand that generation of CK pairs at the initial key length 704 may not satisfy the observed demand for certificates. For example, a rate of receiving requests at the server may meet a threshold level of received requests at a time earlier than anticipated (e.g., at time T5). In some embodiments, the threshold level may include a rate at which requests are received by the server.

When the server determines that the generation of CK pairs at the initial key link may not satisfy the observed demand, the server may adjust the key length to increase the rate of CK pair production to satisfy the observed demand. In some embodiments, the server may generate at least one CK pair at a shorter key length than the initial key length. The server may determine a quantity of CK pairs to generate using the shorter key length based on the observed demand. For example, lines 724, 726, and 728 each indicate adjusted CK pair generation that includes different numbers, or a different proportion, of CK pairs generated using the initial key length and the adjusted key length. Line 726 represents CK pair generation including a greater number of CK pairs generated using the shorter key length than line 728, and line 724 represents CK pair generation including a greater number of CK pairs generated using the shorter key length than line 726. The server may then generate CK pairs using the determined number (or determined proportion) of key lengths. In some embodiments, a slope of a tangent to the observed demand of certificate-key pairs may be determined at a time which may include the peak observed requests for certificates. In some embodiments, the peak for observed requests may be predicted based on the anticipated demand for certificates, which may be based on some or all of the information used to determine the anticipated demand. For example, the server may determine that the number (or proportion) of keys generated using the initial and adjusted key lengths that is represented by line 726 satisfies the observed demand, and the server may generate CK pairs accordingly.

Figure 8:
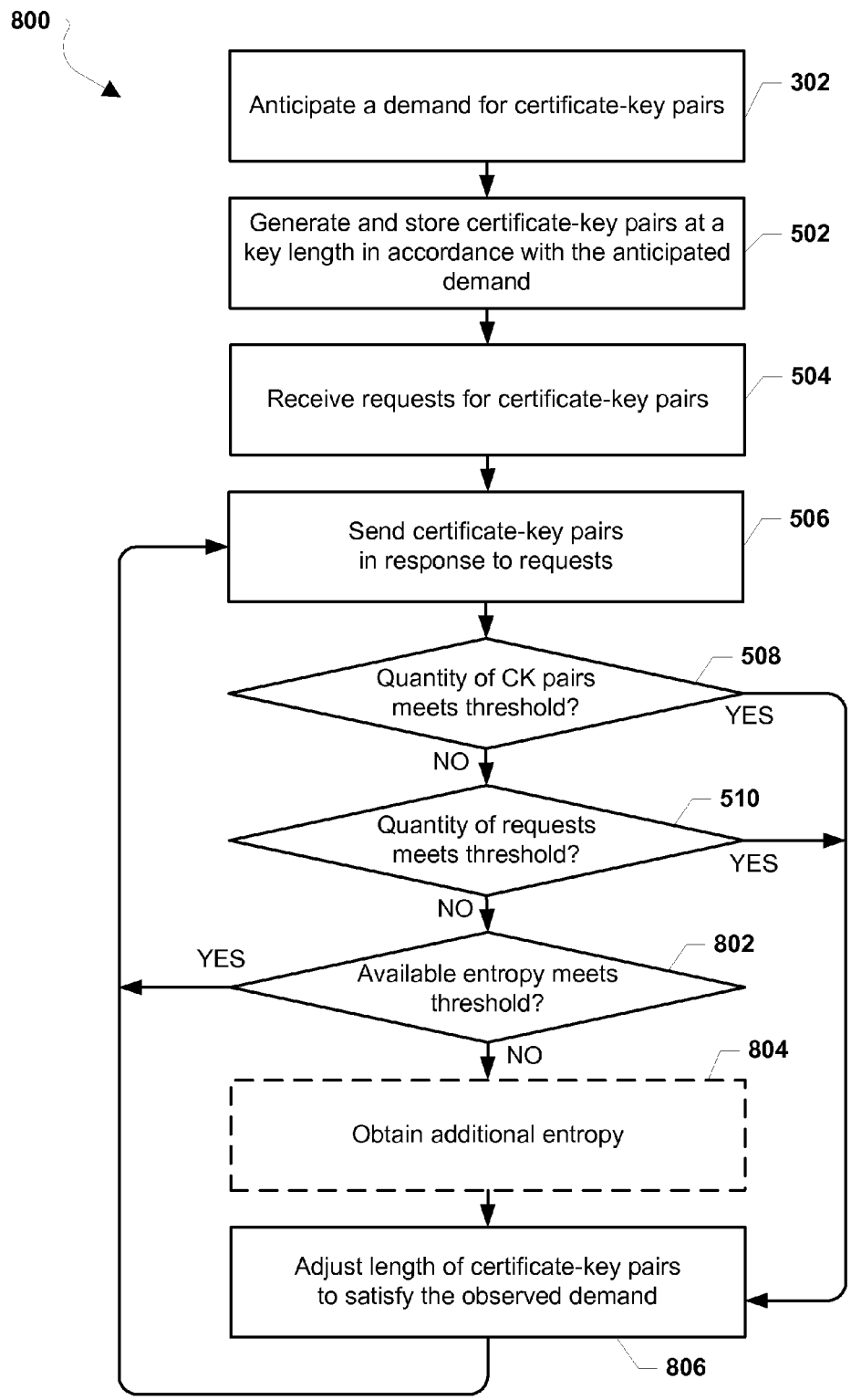
FIG. 8 is a process flow diagram illustrating another method of certificate-key pair generation, according to various embodiments.

FIG. 8 illustrates a method 800 for certificate-key pair generation according to various embodiments. The method 800 may be implemented by a processor of a network element, such as a server (e.g., a processor of the server 108 of FIG. 1) or another similar processor. In block 302, the server may determine an anticipated number of certificate-key pairs to be requested for an application. In block 502, the server may generate certificate-key pairs at a key length in accordance with the anticipated demand, and the server may store the generated CK pairs in a cache, such as the cache 402 in FIG. 4. In block 504, the server may receive requests for certificates from devices, such as the mobile device 102 of FIG. 1, and in block 506, the server may send CK pairs to the requesting devices. The server may also monitor the number of stored CK pairs and the number of request for CK pair received by the server. In determination block 508—"YES", when the quantity of CK pairs meets the threshold, the server may adjust the length of one or more CK pairs to be generated to satisfy the observed demand (in block 806). When the quantity of CK pairs does not meet a threshold of certificates stored in the cache (i.e., determination block 508—"NO"), the server may determine whether the quantity of requests for certificates meets a request threshold, such as the alarm threshold 410 in FIG. 4. In determination block 510—"YES", when the quantity of requests for certificates meets the request threshold, the server may adjust the length of one or more CK pairs to be generated to satisfy the observed demand (in block 806).

In determination block 510—"NO", when the quantity of requests for certificates does not meet the threshold, the server may determine whether sufficient entropy is available to generate CK pairs to meet the observed demand (in determination block 802). True entropy is a resource that may be required to generate certificates. The use of entropy to generate keys enables the generation of truly random keys, and thus cryptographically secure keys. The entropy may include random data collected by from a hardware source, such as noise at an antenna, wire, or another communication link, a circuit designed to produce randomness such as white noise, entropy derived from signals from another hardware source such as a camera, a mouse, or another input device, or software configured to provide true randomness. Entropy may be stored at one or more servers. In determination block 802—"YES", when the amount of stored entropy at the server is sufficient to meet an entropy threshold, the server may send CK pairs to the requesting devices (in block 506). In determination block 802—"NO", when the amount of stored entropy at the server is not sufficient to meet the entropy threshold, in optional block 804, the server may request additional entropy from one or more other servers (or other entropy storage locations/devices). In some embodiments, the server may request additional entropy from one or more other servers at least to meet the entropy threshold. Then, in block 806, the server may adjust the length of one or more CK pairs to be generated to satisfy the observed demand.

In some embodiments, the server may maintain a target number of certificates (such as stocking target 406, in FIG. 4), and further, the server may initially generate keys that maximize the security of the keys (e.g., generate keys at a first, longer length). The server may monitor the anticipated demand for CK pairs, received requests for CK pairs, and the amount of entropy available (e.g., in an entropy pool or another entropy storage). The server may further monitor whether CK pairs may be generated to meet anticipated demand, and/or the received requests for CK pairs, at the initial key length (i.e., the initial level of complexity).

Figure 9:
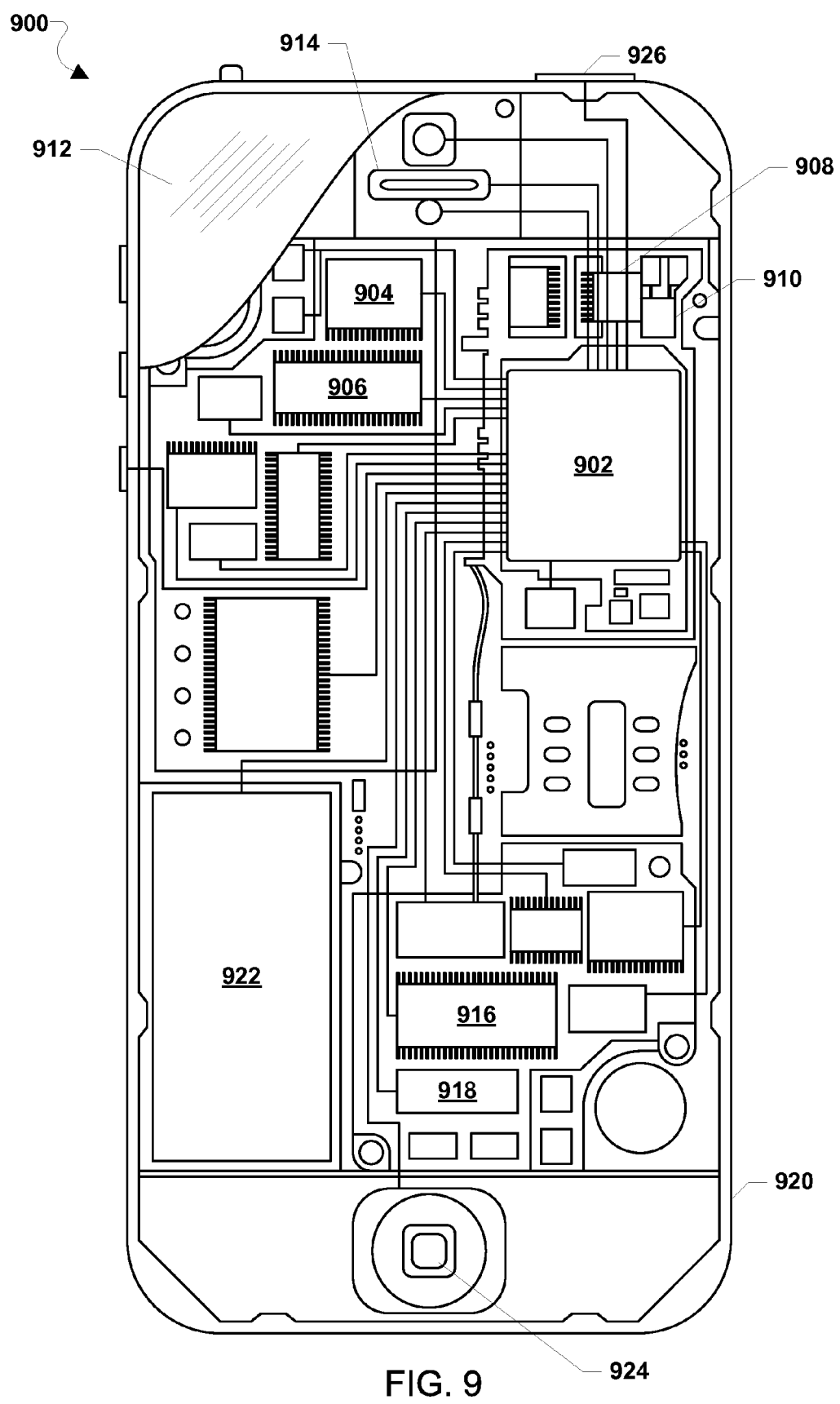
FIG. 9 is a component block diagram of a mobile communication device suitable for use with various embodiments.

Various embodiments may be implemented in any of a variety of communication devices, an example of which (e.g., a mobile communication device 900) is illustrated in FIG. 9. In various embodiments, the mobile communication device 900 may be similar to the mobile communication device 102 as described with reference to FIGS. 1-2.

The mobile communication device 900 may include a processor 902 coupled to a touchscreen controller 904 and an internal memory 906. The processor 902 may be one or more multi-core integrated circuits designated for general or specific processing tasks. The internal memory 906 may be volatile or non-volatile memory, and may also be secure and/or encrypted memory, or unsecure and/or unencrypted memory, or any combination thereof. The touchscreen controller 904 and the processor 902 may also be coupled to a touchscreen panel 912, such as a resistive-sensing touchscreen, capacitive-sensing touchscreen, infrared sensing touchscreen, etc. Additionally, the display of the mobile communication device 900 need not have touch screen capability.

The mobile communication device 900 may have two or more radio signal transceivers 908 (e.g., Peanut, Bluetooth, Zigbee, Wi-Fi, RF radio) and antennae 910, for sending and receiving communications, coupled to each other and/or to the processor 902. The transceivers 908 and antennae 910 may be used with the above-mentioned circuitry to implement the various wireless transmission protocol stacks and interfaces. The mobile communication device 900 may include one or more cellular network wireless modem chip(s) 916 coupled to the processor and antennae 910 that enable communication via two or more cellular networks via two or more radio access technologies.

The mobile communication device 900 may include a peripheral device connection interface 918 coupled to the processor 902. The peripheral device connection interface 918 may be singularly configured to accept one type of connection, or may be configured to accept various types of physical and communication connections, common or proprietary, such as USB, FireWire, Thunderbolt, or PCIe. The peripheral device connection interface 918 may also be coupled to a similarly configured peripheral device connection port (not shown).

The mobile communication device 900 may also include speakers 914 for providing audio outputs. The mobile communication device 900 may also include a housing 920, constructed of a plastic, metal, or a combination of materials, for containing all or some of the components discussed herein. The mobile communication device 900 may include a power source 922 coupled to the processor 902, such as a disposable or rechargeable battery. The rechargeable battery may also be coupled to the peripheral device connection port to receive a charging current from a source external to the mobile communication device 900. The mobile communication device 900 may also include a physical button 924 for receiving user inputs. The mobile communication device 900 may also include a power button 926 for turning the mobile communication device 900 on and off.

Figure 10:
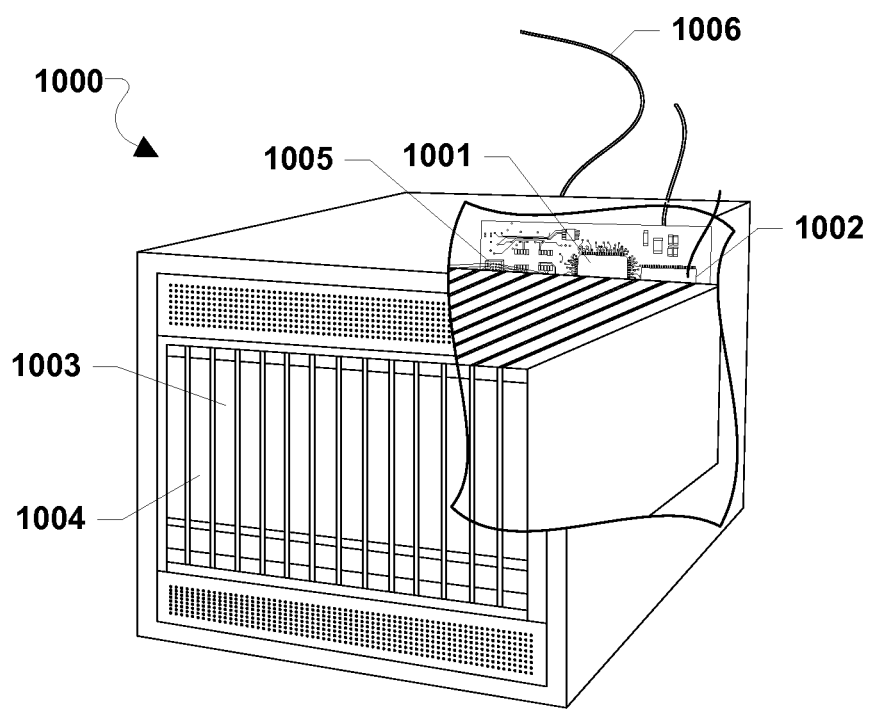
FIG. 10 is a component block diagram of a server suitable for use with various embodiments.

Portions of the embodiment methods may be accomplished in a client-server architecture with some of the processing occurring in a server, such as maintaining databases of normal operational behaviors, which may be accessed by a computing device processor while executing the embodiment methods. Such embodiments may be implemented on any of a variety of commercially available server computing devices, such as the server 1000 illustrated in FIG. 10. In various embodiments, the server 1000 may be similar to the servers 108, 202, 204, 206, and 208 as described with reference to FIGS. 1-2. Such a server 1000 typically includes a processor 1001 coupled to volatile memory 1002 and a large capacity nonvolatile memory, such as a disk drive 1003. The server 1000 may also include a floppy disc drive, compact disc (CD) or DVD disc drive 1004 coupled to the processor 1001. The server 1000 may also include network access ports 1005 coupled to the processor 1001 for establishing data connections with a network 1006, such as a local area network coupled to other broadcast system computers and servers. The processor 1001 may be any programmable microprocessor, microcomputer or multiple processor chip or chips that can be configured by software instructions (applications) to perform a variety of functions, including the functions of the various embodiments described above. Typically, software applications may be stored in the internal memory 1002, 1003 before they are accessed and loaded into the processor 1001. The processor 1001 may include internal memory sufficient to store the application software instructions.

The processors 901 and 1001 may be any programmable microprocessor, microcomputer or multiple processor chip or chips that can be configured by software instructions (applications) to perform a variety of functions, including the functions of various embodiments described below. In some mobile devices, multiple processors 901 may be provided, such as one processor dedicated to wireless communication functions and one processor dedicated to running other applications. Typically, software applications may be stored in the internal memory 901 and 1001 before they are accessed and loaded into the processor 901 and 1001. The processor 901 and 1001 may include internal memory sufficient to store the application software instructions.

Various embodiments may be implemented in any number of single or multi-processor systems. Generally, processes are executed on a processor in short time slices so that it appears that multiple processes are running simultaneously on a single processor. When a process is removed from a processor at the end of a time slice, information pertaining to the current operating state of the process is stored in memory so the process may seamlessly resume its operations when it returns to execution on the processor. This operational state data may include the process's address space, stack space, virtual address space, register set image (e.g. program counter, stack pointer, instruction register, program status word, etc.), accounting information, permissions, access restrictions, and state information.

A process may spawn other processes, and the spawned process (i.e., a child process) may inherit some of the permissions and access restrictions (i.e., context) of the spawning process (i.e., the parent process). A process may be a heavy-weight process that includes multiple lightweight processes or threads, which are processes that share all or portions of their context (e.g., address space, stack, permissions and/or access restrictions, etc.) with other processes/threads. Thus, a single process may include multiple lightweight processes or threads that share, have access to, and/or operate within a single context (i.e., the processor's context).

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

While the foregoing describes that a threshold may be met when a value is greater than or equal to the threshold, it will be appreciated that this is not a limitation, and that In some embodiments a threshold may be met when a value exceeds the threshold and not met when the value is less than or equal to the threshold.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of certificate-key pair generation, comprising:
   anticipating, at a server of a network element, a demand for certificate-key pairs;
   generating, at the server, certificate-key pairs at a key length in accordance with the anticipated demand for certificate-key pairs;
   monitoring, at the server, whether a generation rate of certificate-key pairs at the key length satisfies an observed demand for certificate-key pairs; and
   adjusting, at the server, the key length when the generation rate of certificate-key pairs at the key length does not satisfy the observed demand for certificate-key pairs, such that at least one of the certificate-key pairs is generated at a second key length that is shorter than the key length, and the certificate-key pairs are generated at a proportion of the key length and the second key length based on the observed demand.

2. The method of claim 1, wherein anticipating the demand for certificate-key pairs comprises determining a number of certificate-key pairs to be requested.

3. The method of claim 2, wherein anticipating the demand for certificate-key pairs is based on at least one of historical requests for the certificate-key pairs, a historical pattern of certificate-key pair requests, a historical certificate-key pair request rate, an anticipated event, and a likelihood that a user or group of users will download an application that requires a certificate-key pair.

4. The method of claim 1, wherein the observed demand for certificate-key pairs comprises a number of requests for certificate-key pairs received at the network element.

5. The method of claim 4, wherein the observed demand for certificate-key pairs comprises a plurality of requests for certificate-key pairs received during a period of time.

6. The method of claim 1, wherein generating certificate-key pairs at a key length in accordance with the anticipated demand for certificate-key pairs comprises determining a start time to begin generating the certificate-key pairs.

7. The method of claim 6, wherein generating certificate-key pairs at a key length in accordance with the anticipated demand comprises determining a start time to begin generating certificate-key pairs such that the anticipated demand will be satisfied.

8. A computing device, comprising:
   a hardware processor configured with processor-executable instructions to:
   anticipate a demand for certificate-key pairs;
   generate certificate-key pairs at a key length in accordance with the anticipated demand for certificate-key pairs;
   monitor whether a generation rate of certificate-key pairs at the key length meets an observed demand for certificate-key pairs; and
   adjust the key length when the generation rate of certificate-key pairs at the key length does not satisfy the observed demand for certificate-key pairs, such that at least one of the certificate-key pairs is generated at a second key length that is shorter than the key length, and the certificate-key pairs are generated at a proportion of the key length and the second key length based on the observed demand.

9. The computing device of claim 8, wherein the processor is further configured with processor-executable instructions to anticipate the demand for certificate-key pairs by determining a number of certificate-key pairs to be requested.

10. The computing device of claim 9, wherein the processor is further configured with processor-executable instructions to anticipate the demand for certificate-key pairs based on at least one of historical requests for the certificate-key pairs, a historical pattern of certificate key-pair requests, a historical certificate key-pair request rate, an anticipated event, and a likelihood that a user or group of users will download an application that requires a certificate-key pair.

11. The computing device of claim 8, wherein the processor is configured with processor-executable instructions such that the observed demand for certificate-key pairs comprises a number of requests for the certificate-key pairs received by the computing device.

12. The computing device of claim 11, wherein the processor is configured with processor-executable instructions such that the observed demand for certificate-key pairs comprises a plurality of requests for the certificate-key pairs received during a period of time.

13. The computing device of claim 8, wherein the processor is further configured with processor-executable instructions to generate certificate-key pairs at a key length in accordance with the anticipated demand for certificate-key pairs by determining a start time to begin generating the certificate-key pairs.

14. The computing device of claim 13, wherein the processor is further configured with processor-executable instructions to generate certificate-key pairs at a key length in accordance with the anticipated demand for certificate-key pairs by determining a start time to begin generating certificate-key pairs such that the anticipated demand will be satisfied.

15. A non-transitory processor-readable storage medium having stored thereon processor-executable software instructions configured to cause a processor to perform operations for certificate-key pair generation, comprising:
   anticipating a demand for certificate-key pairs;
   generating certificate-key pairs at a key length in accordance with the anticipated demand;

monitoring whether a generation rate of certificate-key pairs at the key length meets an observed demand for certificate-key pairs; and adjusting the key length when the generation of certificate-key pairs at the key length does not satisfy the observed demand for certificate-key pairs, such that at least one of the certificate-key pairs is generated at a second key length that is shorter than the key length, and the certificate-key pairs are generated at a proportion of the key length and the second key length based on the observed demand.

16. The non-transitory processor-readable storage medium of claim 15, wherein the stored processor-executable software instructions are configured to cause a processor to perform operations such that anticipating the demand for certificate-key pairs comprises determining a number of certificate-key pairs to be requested.

17. The non-transitory processor-readable storage medium of claim 16, wherein the stored processor-executable software instructions are configured to cause a processor to perform operations such that anticipating the demand for certificate-key pairs is based on at least one of historical requests for the certificate-key pairs, a historical pattern of certificate-key pair requests, a historical certificate-key pair request rate, an anticipated event, and a likelihood that a user or group of users will download an application that requires a certificate-key pair.

18. The non-transitory processor-readable storage medium of claim 15, wherein the stored processor-executable software instructions are configured to cause a processor to perform operations such that the observed demand for certificate-key pairs comprises a number of requests for the certificate-key pairs received at a network element.

19. The non-transitory processor-readable storage medium of claim 18, wherein the stored processor-executable software instructions are configured to cause a processor to perform operations such that the observed demand for certificate-key pairs comprises a plurality of requests for the certificate-key pairs received during a period of time.

20. The non-transitory processor-readable storage medium of claim 15, wherein the stored processor-executable software instructions are configured to cause a processor to perform operations such that generating certificate-key pairs at a key length in accordance with the anticipated demand for certificate-key pairs comprises determining a start time to begin generating the certificate-key pairs.

21. The non-transitory processor-readable storage medium of claim 20, wherein the stored processor-executable software instructions are configured to cause a processor to perform operations such that generating certificate-key pairs at a key length in accordance with the anticipated demand for certificate-key pairs comprises determining a start time to begin generating certificate-key pairs such that the anticipated demand will be satisfied.

22. A computing device, comprising:
means for anticipating a demand for certificate-key pairs;
means for generating certificate-key pairs at a key length in accordance with the anticipated demand for certificate-key pairs;
means for monitoring whether a generation rate of certificate-key pairs at the key length meets an observed demand for certificate-key pairs; and
means for adjusting the key length when the generation rate of certificate-key pairs at the key length does not satisfy the observed demand for certificate-key pairs, such that at least one of the certificate-key pairs is generated at a second key length that is shorter than the key length, and the certificate-key pairs are generated at a proportion of the key length and the second key length based on the observed demand.

23. The computing device of claim 22, wherein means for anticipating the demand for certificate-key pairs comprises means for determining a number of certificate-key pairs to be requested.

24. The computing device of claim 22, wherein means for generating certificate-key pairs at a key length in accordance with the anticipated demand for certificate-key pairs comprises means for determining a start time to begin generating certificate-key pairs.

* * * * *